US007225078B2

(12) United States Patent
Shelley et al.

(10) Patent No.: US 7,225,078 B2
(45) Date of Patent: May 29, 2007

(54) METHOD AND SYSTEM FOR PREDICTING PRODUCTION OF A WELL

(75) Inventors: Robert F. Shelley, Katy, TX (US); Maged Fam, Katy, TX (US); Federico Sorenson, Neuquen (AR); Miguel H. Pettinato, Chubut (AR)

(73) Assignee: Halliburton Energy Services, Inc., Duncan, OK (US)

( * ) Notice: Subject to any disclaimer, the term of this patent is extended or adjusted under 35 U.S.C. 154(b) by 174 days.

(21) Appl. No.: 10/980,049

(22) Filed: Nov. 3, 2004

(65) Prior Publication Data

US 2006/0092766 A1 May 4, 2006

(51) Int. Cl.
*G01V 3/00* (2006.01)

(52) U.S. Cl. .......................... 702/13

(58) Field of Classification Search .................... 702/8, 702/12, 13, 7, 11; 324/303

See application file for complete search history.

(56) References Cited

U.S. PATENT DOCUMENTS

| | | | |
|---|---|---|---|
| 4,749,038 | A | 6/1988 | Shelley |
| 5,557,200 | A | 9/1996 | Coates |
| 5,572,021 | A | 11/1996 | Heathman et al. |
| 5,936,405 | A | 8/1999 | Prammer et al. |
| 6,242,912 | B1 | 6/2001 | Prammer et al. |
| 6,255,819 | B1 | 7/2001 | Day et al. |
| 6,283,210 | B1 | 9/2001 | Soliman et al. |
| 6,366,088 | B1 | 4/2002 | Hagiwara |
| 6,469,636 | B1 | 10/2002 | Baird et al. |
| 6,512,371 | B2 | 1/2003 | Prammer |
| 6,518,756 | B1 | 2/2003 | Morys et al. |
| 6,525,534 | B2 | 2/2003 | Akkurt et al. |
| 6,531,868 | B2 | 3/2003 | Prammer |
| 6,541,969 | B2 | 4/2003 | Sigal et al. |
| 6,577,125 | B2 | 6/2003 | Prammer et al. |
| 6,646,437 | B1 | 11/2003 | Chitale et al. |
| 6,661,226 | B1 | 12/2003 | Hou et al. |
| 2002/0167314 | A1 | 11/2002 | Prammer |
| 2003/0050758 | A1 | 3/2003 | Soliman et al. |
| 2003/0085816 | A1 | 5/2003 | Baird et al. |
| 2003/0094946 | A1 | 5/2003 | Galford et al. |
| 2003/0119107 | A1 | 6/2003 | Dang et al. |
| 2003/0201772 | A1 | 10/2003 | Sigal et al. |
| 2004/0008027 | A1 | 1/2004 | Prammer |
| 2004/0028663 | A1 | 2/2004 | Ohno |
| 2004/0090230 | A1 | 5/2004 | Appel et al. |

FOREIGN PATENT DOCUMENTS

| | | |
|---|---|---|
| WO | WO 99/28767 | 6/1999 |

OTHER PUBLICATIONS

David Allen et al., (How to Use Borehole Nuclear Magnetic Resonance, Oildfield Review, published Summer 1997, pp. 34-57.*

(Continued)

*Primary Examiner*—D. McElheny, Jr.
(74) *Attorney, Agent, or Firm*—Robert A. Kent; Fish & Richardson, P.C.

(57) ABSTRACT

Production of a well is predicted by associating log profiles for wells in a reservoir to production indicators for wells in the reservoir. A log for the well is matched to a corresponding log profile. The log profiles may each be generated by clustering logs for wells in the reservoir. The log profiles and logs may include magnetic resonance imaging (MRI) and/or other suitable data.

75 Claims, 9 Drawing Sheets

OTHER PUBLICATIONS

"Geo-Engineering Modeling through INternet Informatics (GEMINI)", DOE Project, published report Jan. 16, 2003, pp. 1-54.*

C.Alimonti, Knowledge Discovery in Databases and Multiphase Flow Metering . . . SPE 77407 dated 2002, 12 pages.

V. Bhushan, A Novel Approach to Identify Reservoir Analogues, SPEber 78388 dated Oct. 2002, 6 pages.

Foreign communication related to a counter part dated Apr. 28, 2006, 40 pages.

Caudill, Maureen, "Neural Networks Primer," Part IV, *AI Expert*, Aug. 1998, pp. 61-67.

Gasteiger, J., et al., "Kohonen Neural Network," *Chem. Int. Ed. Engl.* 1993, 4 pages, <http://mmlin1.pha.unc.edu/~jin/QSAR/KNN2/som.html>, accessed and printed on Aug. 16, 2004.

"Neural net: A preliminary definition," 1 page, <http://www.shef.ac.uk/psychology/gurney/notes/11/section3_1.html>, accessed and printed on Aug. 16, 2004.

"Network features," 1 page, <http://www.shef.ac.uk/psychology/gurney/notes/11/section3_7.html>, accessed and printed on Aug. 16, 2004.

"Neural Networks," © Copyright StatSoft, Inc., 1984-2003, 34 pages <http://www.statsoftinc.com/textbook/stneunet.html>, accessed and printed on Aug. 16, 2004.

Smith, Prof. Leslie, "An Introduction to Neural Networks", *Centre for Cognitive and Computational Neuroscience, Department of Computing and Mathematics, University of Stirling*, last major update Oct. 25, 1996, minor update Apr. 22, 1998 and Sep. 12, 2001, http://www.cs.stir.ac.uk/~lss/NNIntro/InvSlides.html, accessed and printed Aug. 16, 2004.

* cited by examiner

PRODUCTION PREDICTION
- WELL NUMBER: HC 182
- MATCHING LOG PROFILE: #3
- WATER SWAB RATE: 302
- OIL SWAB RATE: 695
- DEEP RESISTIVITY: 33
- SHALLOW RESISTIVITY: 38
- SWAB SALINITY: 35
- SWAB OIL API DENSITY: 24
- POROSITY: 21

PRODUCTION PREDICTION
- WELL NUMBER: HC 158
- MATCHING LOG PROFILE: #1
- WATER SWAB RATE: 130
- OIL SWAB RATE: 55
- DEEP RESISTIVITY: 13
- SHALLOW RESISTIVITY: 20
- SWAB SALINITY: 31
- SWAB OIL API DENSITY: 22
- POROSITY: 12.5

METHOD AND SYSTEM FOR PREDICTING PRODUCTION OF A WELL

TECHNICAL FIELD

This disclosure relates generally to the field of well evaluation, and more particularly to a method and system for predicting production of a well.

BACKGROUND

Oil and gas reservoirs are underground formations of rock containing oil and/or gas. The type and properties of the rock vary by reservoir and also within reservoirs. For example, the porosity and permeability of a reservoir rock may vary from well to well within a reservoir. The porosity is the percentage of pore volume, or void space, within the reservoir rock that can contain fluids. The permeability is an estimate of the reservoir rock's ability to flow or transmit fluids. Other reservoir properties that affect production of a well include reservoir pressure, temperature, hydrocarbon percentage and skin effect for the well.

Reservoir properties are often determined or inferred from down hole well logs. Well logging data includes data from sonic logging, gamma ray logging, electric logging, and magnetic resonance imaging (MRI) logging. MRI provides environmentally safe logging that is unaffected by variations in matrix mineralogy. MRI is widely used to estimate the bulk volume of fluids of a reservoir. MRI allows fluid filled pore space to be partitioned into static and dynamic quantities, those fluids that will be held to the rock and fluids that will be produced. Permeability can be computed from the relationship between moveable and irreducible fluid volumes.

Estimating production of oil, gas and/or byproducts from a well is highly interpretive. A common method for confirming production for a well is a short term production test such as a swab test in which a tool or seal is moved in the well bore to reduce pressure. In response to the reduced pressure, reservoir fluids flow into the well bore and towards the surface for measurement and testing.

SUMMARY

A method and system for predicting production of a well are provided. Production may be predicted for a well in a reservoir based on log profiles that correlate to production indicators for wells in the reservoir.

In accordance with one embodiment, production of a well may be predicted by associating log profiles for wells in a reservoir to production indicators for wells in the reservoir. A log for the well may be matched to a corresponding log profile.

In specific embodiments, the log profiles may each comprise a composite of individual log responses. The log profiles may be of one or more well characteristics. The one or more characteristics may include reservoir attributes such as petrophysical properties. The petrophysical properties may include magnetic resonance imaging (MRI) data including porosity and at least one of polarization time ($T_1$) and/or relaxation time ($T_2$).

In accordance with another aspect of the disclosure, a model for predicting production of a well may include a plurality of log profiles. The log profiles may each be based on neural network grouping method of well logs. A production profile may be associated with each log profile.

In accordance with still another aspect of the disclosure, a method for generating a production prediction model may include providing logs for a plurality of wells in a reservoir. The logs may be clustered or otherwise grouped into a limited number of log profiles. The log profiles may be associated to production indicators.

In accordance with still another aspect of the disclosure, a system for generating a production prediction model may include a cluster engine and a correlation engine. The cluster engine may be operable to receive logs for a plurality of wells in the reservoir and to cluster the logs into a limited number of log profiles. The correlation engine may be operable to correlate the log profiles to production indicators for the wells.

Technical advantages of some, all or none of the embodiments may include relating logs for a well to production indicators for the well. As a result, production for a well may be predicted earlier, more accurately and/or less expensively based on well logs. In a particular example, conflicting engineering interpretations may be clarified. Direction for achieving improved and/or optimized hydrocarbon production from the well may also be provided.

Another technical advantage of some, all or none of the embodiments may include predicting production for a well without swab and/or other production testing of the well. In particular, well logs for a reservoir may be clustered to identify log profiles for the wells. Each log profile may be associated with one or more production indicators. Logs for later drilled and/or other wells may each be matched to a corresponding log profile and associated production indicators.

Still another technical advantage of some, all or none of the embodiments may be on-site well production evaluation. In particular, logs may be locally on a well site matched to production indicators using a production prediction model. Further and/or more detailed analysis may be performed remotely at a central site and provided to the well site in real-time or near real-time in connection with logging operations.

Still another technical advantage of some, all or none of the embodiments may include integrating magnetic resonance imaging (MRI) logs with other reservoir data to provide an enhanced well analysis tool. MRI logging data is environmentally safe and is less affected by variations in matrix mineralogy than other logging tools. Trends may be identified within clustered MRI data and decisions made based on the behavior of these trends.

The details of one or more embodiments of the disclosure are set forth in the accompanying drawings and the description below. Other features, objects, and advantages of some of the embodiments will be apparent from the description and drawings, and from the claims.

DETAILED DESCRIPTION

Figure 1:
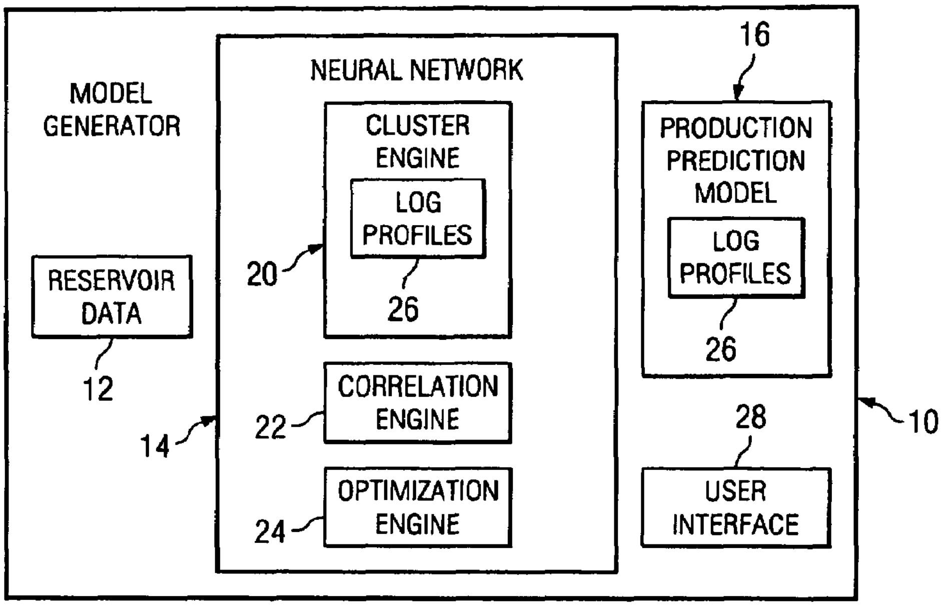
FIG. 1 illustrates one embodiment of a system for generating a production prediction model.

FIG. 1 illustrates one embodiment of a model generator 10. Model generator 10 is operable to generate a model for correlating one or more logs for a well to production potential of the well. Production of a well may include production from a single, multiple or all reservoirs intersected by the well and/or a single, multiple or all zones of the one or more reservoirs. Model generator 10 may be implemented as an integrated computer system such as a personal computer, laptop, or other stand alone system. Model generator 10 may also be implemented as a distributed computer system with elements of the model generator 10 connected locally and/or remotely by a computer or other communication network.

Referring to FIG. 1, model generator 10 includes reservoir data 12, neural network 14, and production prediction model 16. Generally described, neural network 14 may process reservoir data 12 to generate production prediction model 16. Production prediction model 16 may be used to predict production of wells and may in some embodiments be updated continuously or periodically. A production prediction of a well is a prediction of an amount, volume, rate or other suitable metric of oil, gas and/or water that can be produced from one or more reservoirs and/or zones of the well. Model generator 10 may include additional, less or different components. In addition, the functionality of one or more components of the model generator 10 may be otherwise suitably performed, distributed or omitted.

Reservoir data 12 comprises one or more databases or other memory storing, otherwise accessing, providing access to or otherwise providing data gathered for a plurality of wells in a reservoir. In one embodiment, disparate reservoirs of the well may be classified as different wells and/or different zones of the reservoirs may be classified as different wells. In this embodiment, the data for the disparate reservoir and/or zones of a well may comprise discrete data sets. Thus, a single physical well may be represented in reservoir data 12 as a plurality of wells. Memory may take the form of volatile or non-volatile memory including, without limitation, magnetic media, optical media, random access memory (RAM), read-only memory (ROM), removable media, or any other suitable local or remote memory component.

Media may be any suitable device operable to electronically store information, including data and programming instructions. Reservoir data 12 may include data collected for wells at various reservoir points. The reservoir data may be measured, modeled or interpreted. A reservoir may be a portion of a formation, an entire formation or a plurality of formations. In one embodiment, for example, the reservoir may comprise a plurality of formations of a same or similar type. The reservoir may have a single or multiple zones. The number of wells represented by the reservoir data 12 may comprise 5, 10, 20, 50, 100, 150, 250 or more wells. In addition, as additional wells are drilled, tested and/or produced, reservoir data 12 may be updated to include the additional data.

The reservoir data 12 may include logs and production indicators collected from wells in the reservoir. As used herein, logs include electronic or other copies of logs obtained from a well, all or a portion of data from a well log and/or data compiled from or otherwise based on a well log. Logs may include one or more reservoir attributes, such as petrophysical properties, collected or derived from sonic logging, gamma ray logging, electric logging, magnetic resonance imaging (MRI) logging and/or other suitable logging operations in and/or for the reservoir. In a particular embodiment, logging data may comprise deep and/or shallow resistivity, salinity, pay and/or gross thickness, oil density, skin thickness, average porosity, a product of average porosity and pay thickness (Phi H) and MRI data. Production indicators include production test results, regular production data and/or other information compiled from or otherwise based on production. In one embodiment, production indicators may be collected from swab tests and/or post completion production of wells in the reservoir. For example, swab test production indicators may include water and/or oil swab rate, dry swab test results, swab oil fraction and normalized swab rate. Other information included in reservoir data 12 may include geological and geochemical data on the reservoir rock and/or entrained fluids as well as production enhancement and other drilling, completion and/or production data.

In one embodiment, MRI logs stored in a reservoir data 12 are collected from MRI logging operations. MRI logging exposes an assembly of magnetic moments, such as those of the hydrogen nuclei, to a static magnetic field. In response, the magnetic moments align along the direction of the magnetic field. Upon consequent application of an oscillating magnetic field, the direction of the magnetic moments is tipped into the transverse plane. Upon cessation of the oscillating magnetic field, the magnetic moments precess to their original alignment, thus generating a magnetic echo. The alignment time of the magnetic moments in the static magnetic field, also known as a longitudinal or spin-lattice relaxation time, is characterized by a time constant $T_1$. The alignment time due to a loss of coherence of the magnetic moments in the oscillating magnetic field, also known as traverse or spin-spin relaxation time, is characterized by a time constant $T_2$. In MRI logging, $T_1$ and/or $T_2$ values are collected downhole and analyzed at the surface to generate a reservoir description report, including clay-bound and capillary-bound related porosity, estimates of the amounts of bound and free fluid, fluid types (oil, gas and water), permeability and other properties of interest. Any other suitable MRI tool and measurements may be used for collecting MRI data for reservoir data 12. MRI data comprise measurements collected by MRI logging as well as data determined from such data. Exemplary MRI logs for a plurality of wells of a reservoir are described in more detail below in connection with FIG. 2.

Neural network 14 may comprise a cluster engine 20, a correlation engine 22 and an optimization engine 24. Neural network 14 may in one embodiment be an interconnected assembly of processing elements, or nodes, with the processing ability of the network stored in inter-unit connection strengths, or weights, obtained by a process of adoption to, or learning from, a set of training patterns. In other embodiments, the cluster engine 20, correlation engine 22 and/or optimization engine 24 may be implemented using standard or other suitable computing processors. For example, the processing of the model generator 10 may be performed by any processor that executes instructions and manipulates data to perform the operations such as, for example, a central processing unit (CPU), a blade, an application specific integrated circuit (ASIC), or a field-programmable gate array (FPGA). Processing may be controlled by logic which may comprise software and/or hardware instructions. The software may comprise a computer readable program code embedded on computer readable medium for performing the methods, processes and operations of model generator 10.

The cluster engine 20 is operable to process logs and other information in reservoir data 12, by clustering or otherwise, and generate log profiles 26. Log profiles 26 are a set of profiles each representative of log behavior for a well type and/or set of wells in the reservoir. The log profiles 26 may in one embodiment identify friends in the log data.

Log profiles 26 are composites clustered, otherwise grouped and/or generated from, using or based on a plurality of individual logs. The log profiles 26 associate reservoirs and/or zones of similar characteristics together to, for example, allow trends within the data to be identified. In effect, the data may be fuzzy to allow trends hidden by inconsistent or inconclusive data to be identifiable. In one embodiment, the cluster engine 20 may comprise a self-organizing map (SOM) operable to cluster a large number of logs into a limited, or reduced number of profiles, or clusters. In this embodiment, the SOM may, in one embodiment, learn to recognize clusters of data and to relate similar classes to each other by adapting node weights to improve data separation. The number of clusters may be predefined by a user or component of the neural network 14 and/or may be adjusted during processing automatically or based on user input. The number of data bins in each cluster may be similarly adjusted. The term "automatically," as used herein, generally means that the appropriate processing is substantially performed by at least part of neural network 14. It should be understood that "automatically" further contemplates any suitable user interaction with neural network 14 without departing from the scope of this disclosure.

In a particular embodiment, log profiles 26 are clustered from the MRI logs. In this embodiment, cluster engine 20 may cluster MRI logs based on porosity data and magnetic resonance time data such as $T_1$ and/or $T_2$. For example, MRI logs may be clustered based on porosity distribution at different $T_1$ and/or $T_2$ values. In this embodiment, the cluster engine 20 may include a bin for a set of T values, for example, from 4 milliseconds to 2,048 milliseconds. Exemplary clustered MRI log profiles 26 are described in more detail below in connection with FIG. 3.

Correlation engine 22 correlates log profiles 26 with validation indicators. Validation indicators are indicators that aid in establishing the viability, usefulness, usability, ease of use, efficiency, accuracy and/or optimization of the log profiles 26. In one embodiment, validation indicators include zone count, water and oil swab test properties, dry swab test results, swab oil fraction test properties, swab rate comparisons-log properties such as deep resistivity, shallow resistivity, swab salinity, pay and gross thickness of a zone, swab oil density, Phi H, average zone thickness and average porosity. Different, additional or less validity indicators may be used.

Correlation engine 22 may output graphs correlating log profiles 26 to validation indicators and/or data indicative of the correlation between log profiles 26 and the validation indicators. Exemplary output graphs from the correlation engine 22 are described in more detail below in connection with FIGS. 4A-I. The graphs may allow alignment of the clusters to reservoir and/or production characteristics to be easily determined.

Optimization engine 24 may receive correlation data from the correlation engine 22 and optimize the log profiles 26. Optimization of the log profiles 26 may comprise any adjustment to the log profiles 26, the cluster engine 20 and/or to the profile generation process to improve the viability, usefulness, usability, ease of use, efficiency and/or accuracy of log profiles 26 generally or in specific circumstances. In one embodiment, the optimization engine 24 may adjust the number of clusters based on the contrast, or heterogeneity between log profiles 26 and log distribution between the log profiles 26, such as a minimum number of well records, or logs, assigned to each cluster. For example, if one or more of the log profiles 26 represents less than a minimum number of wells, the optimization engine 24 may reduce the number of clusters and initiate reprocessing of logs in the reservoir data 12 by the cluster engine 20. In another example, if one or more of the log profiles 26 are very similar, the optimization engine 24 may also reduce the number of clusters and initiate reprocessing by the cluster engine 20. The optimization engine 24 may in another example increase the number of clusters until log profile similarity exist and/or one or more clusters includes below a minimum number of wells in order to establish an upper limit on the number of clusters and thereafter select a fewer number of clusters for optimization of the log profiles 26.

The optimization engine 24 may also adjust the number of clusters to obtain or approach a linear or other suitable arrangement of log profiles 26 with similar log profiles 26 arranged next to each other. In some embodiments, correlation engine 22 and optimization engine 24 may be omitted with the number of clusters determined by default, by other suitable input, or by a user. For example, the number of clusters may be predefined or dynamically defined based on the reservoir type and/or the number of well records. The number of clusters may also be manually adjusted by the operator or other user. A user may access the cluster engine 20 or other components of the neural network 14 locally or remotely through a graphical user interface (GUI) or other suitable interface. For example, the model generator 10 may also include an integrated user interface 28.

The production prediction model 16 may be output from the cluster engine 20, or in one embodiment may be the trained cluster engine 20. In another embodiment, the production prediction model 16 may be only the log profiles 26 or the log profiles 26 with additional information such as the validation information or other information correlating the profiles to production indicators. The production indicators may comprise parameter averages for wells represented, or assigned, to each cluster. In this embodiment, the production prediction model 16 may include a SOM or other suitable mapping engine for mapping or otherwise matching received logs to the log profiles 26. Use of the production prediction model 16 is described in more detail below in connection with FIG. 6.

Figure 2:
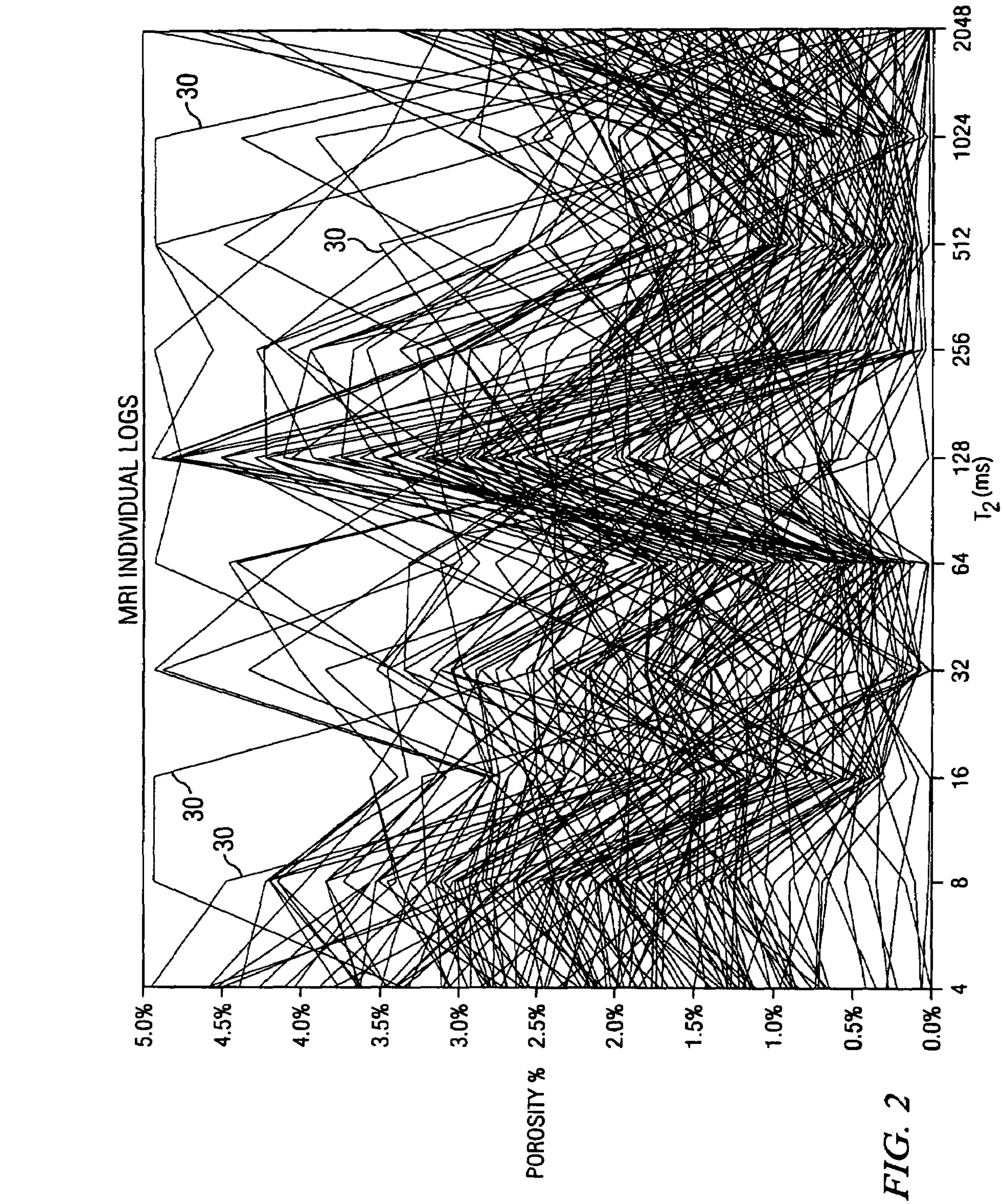
FIG. 2 illustrates exemplary MRI logs for wells in a reservoir.

FIG. 2 illustrates exemplary MRI logs 30 for a plurality of wells in a reservoir. In this embodiment, MRI logs 30 include a porosity distribution at different relaxation times ($T_2$). In particular, FIG. 2 illustrates a porosity percentage distribution at $T_2$-of 4, -8, -16, -32, -64, -128, -256, -512, -1024 and -2048 milliseconds for wells in a reservoir. In this embodiment, each $T_2$ value represents a bin for the clustering process. Other suitable data from MRI logs 30 may be used.

Figure 3:
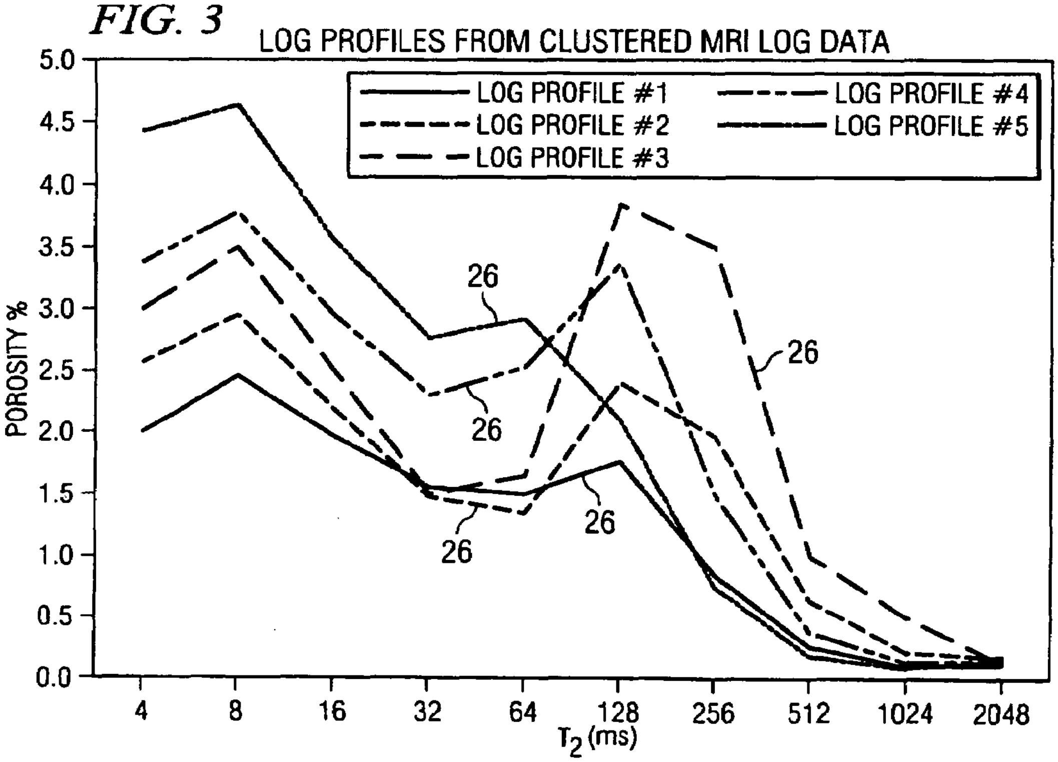
FIG. 3 illustrates exemplary log profiles clustered from the well logs of FIG. 2.

FIG. 3 illustrates exemplary log profiles 26 clustered from the MRI individual logs 30 of FIG. 2. In this embodiment, MRI logs 30 are grouped into five clustered log profiles 26, each with distinct characteristics of $T_2$ and porosity with suitable contrast. As previously described, any suitable number of clusters may be used based on the input logs. Further, the number of clusters may be adjusted during processing for optimization.

Referring to FIG. 3, the exemplary log profiles 26 have $T_2$ porosity distributions that are bimodal in nature but different in shape. The wells assigned to clusters #1 and #5 are the least bimodal and cluster #3 the most distinct bimodal character. Cluster #3 has the highest porosities in the range of $T_2$-128 to $T_2$-512 porosity bins and cluster #5 the highest values in the $T_2$-4 through $T_2$-16 bins. Cluster #2 is intermediate in nature between clusters #1 and #3. Cluster #4 is intermediate between clusters #3 and #5.

Figure 4A:
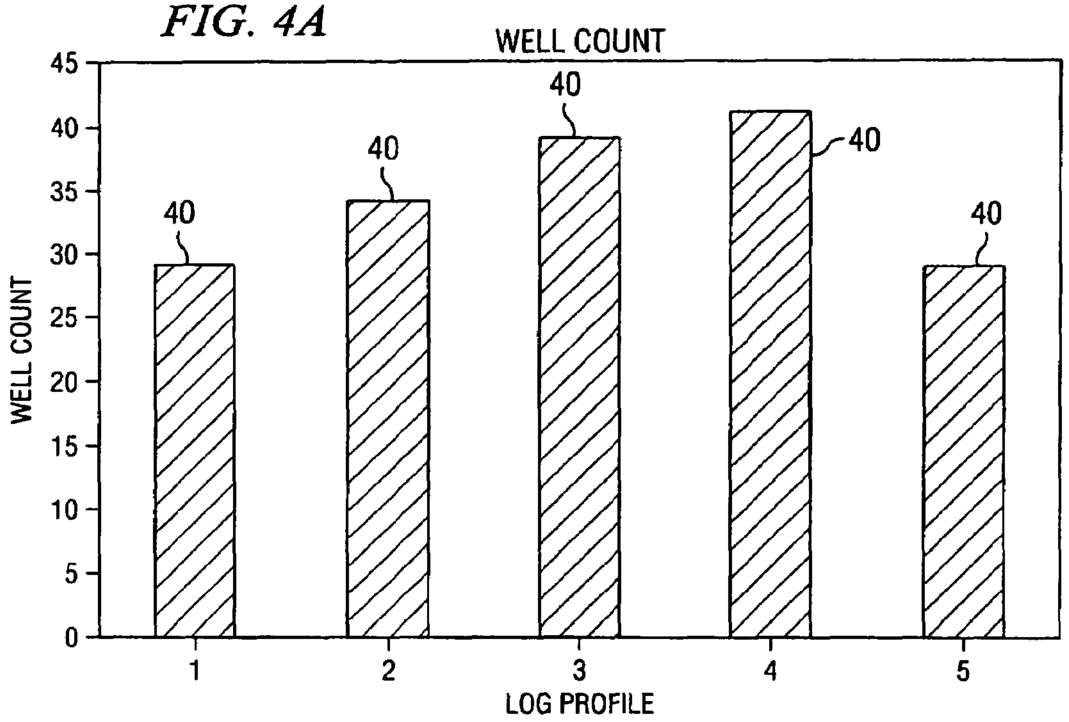
FIGS. 4A-I illustrate correlation of the log profiles of FIG. 3 to exemplary validation indicators.

FIGS. 4A-I illustrate correlation of the log profiles 26 to validate indicators. FIG. 4A illustrates well count 40 per log profile 26 for the exemplary log profiles 26 of FIG. 3. In particular, each log profile 26 includes records from at least 25 wells with the low being 29 wells and the high being 41 wells. Accordingly, each log profile 26 is representative of a substantial number of wells. During the optimization process, if any log profile 26 had a well count below a threshold value, logs 30 from the reservoir data 12 may be reprocessed with a reduced number of clusters. In the exemplary embodiment, a threshold well count for each log profile 26 may be, for example, 15. The threshold well count may vary based on the total number of wells and the number of clusters.

Figure 4B:
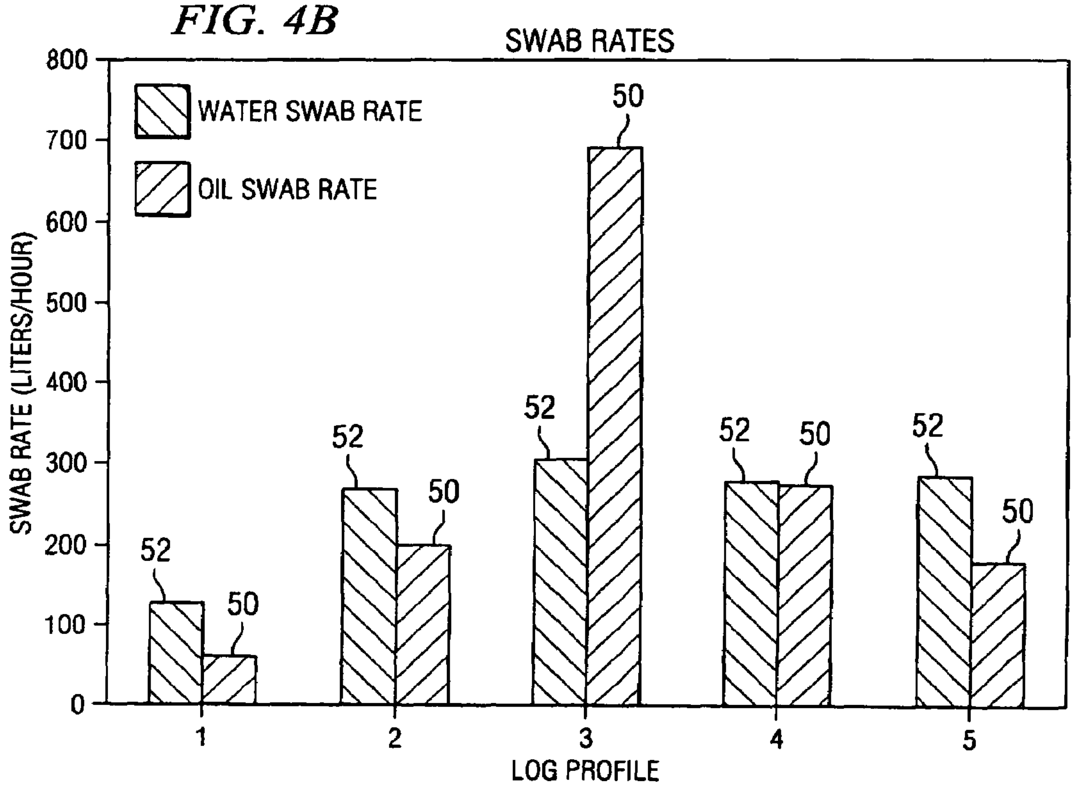

FIG. 4B illustrates swab rates for the exemplary log profiles 26 of FIG. 3. In particular, each of the log profiles 26 is correlated with water and oil swab rates 50 and water swab rate 52 of wells represented by the log profiles 26. The log profiles 26 have a strong linear alignment in that log profiles #2 and #4 that are closest in swab rates to log profile #3 are positioned next to log profile #3 with log profiles #1 and #5 that show the biggest difference with log profile #3 being positioned outside log profiles #2 and #4.

Figure 4C:
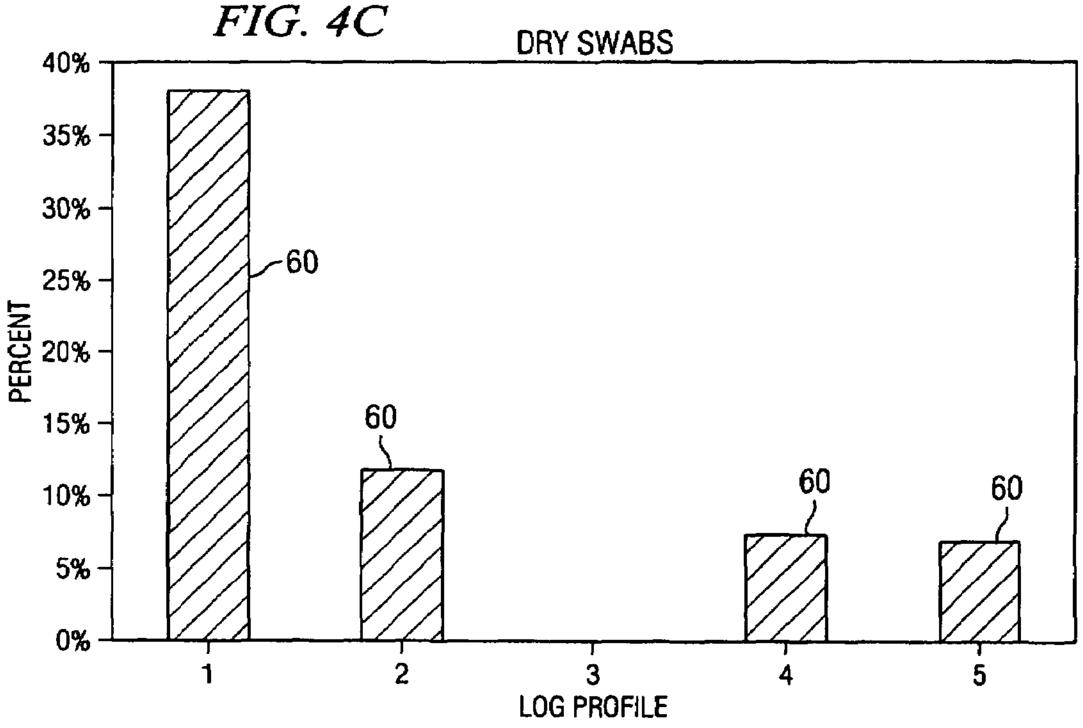

FIG. 4C illustrates dry swabs 60 for the exemplary log profiles 26 of FIG. 3. In particular, each log profile 26 is correlated to the percentage of wells in the log profile 26 having dry swab tests. For the exemplary log profiles 26, log profile #3 had no wells with dry swab tests while neighboring log profiles #2 and #4 had a limited number of wells with dry swab tests. Log profile #1 had a relatively large number of wells with dry swab tests.

Figure 4D:
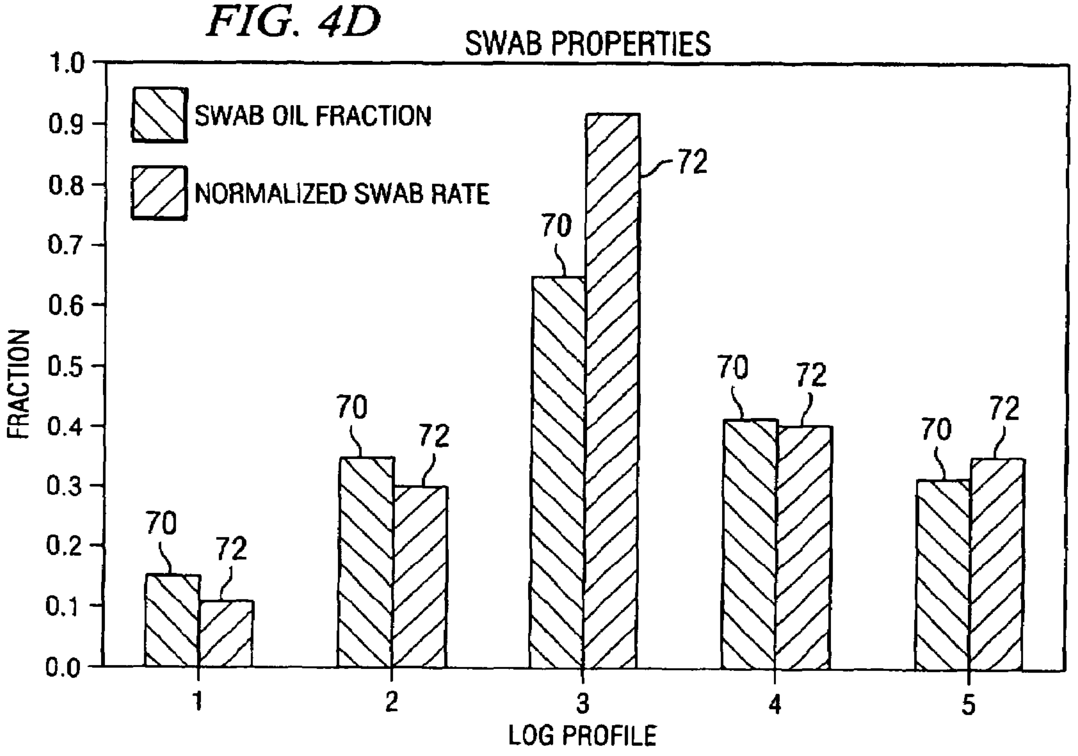

FIG. 4D illustrates swab properties for the exemplary log profiles 26 of FIG. 3. In particular, each log profile 26 is correlated to swab oil fraction 70 and a normalized swab rate 72 of wells represented by the log profiles 26. For the exemplary log profile 26, log profile #3 has the highest swab oil fraction 70, followed by adjacent log profiles #2 and #4.

Figure 4E:
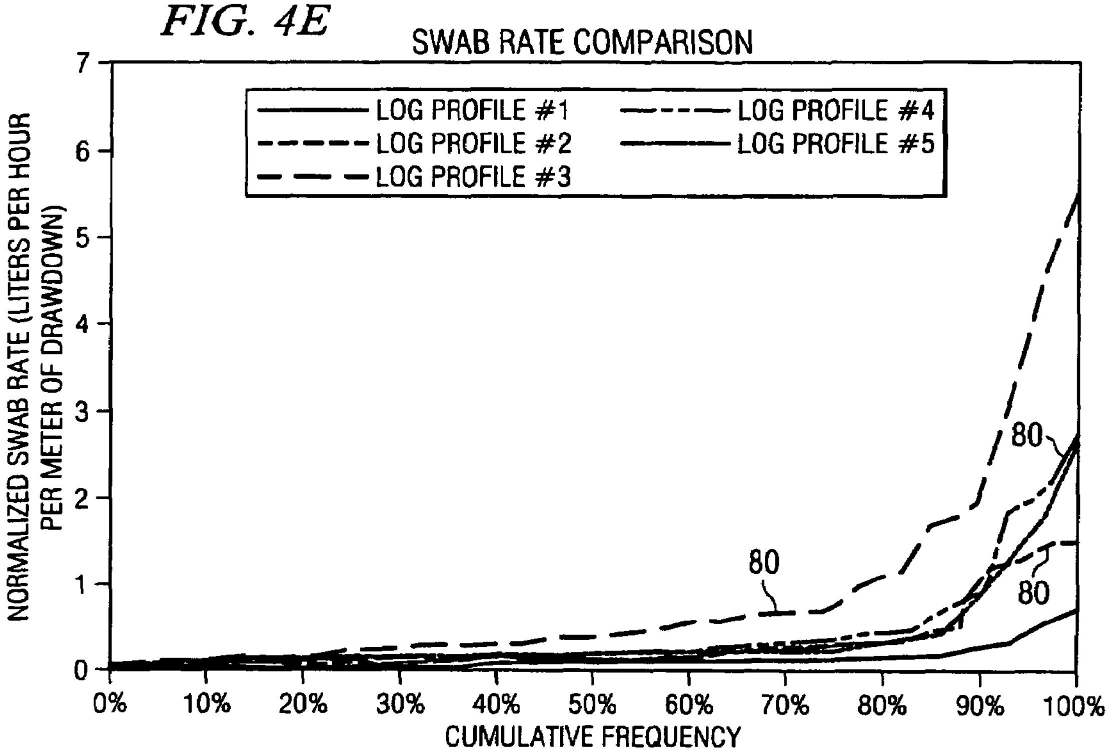

FIG. 4E illustrates swab rate comparisons for the exemplary log profiles 26 of FIG. 3. In particular, each log profile 26 is correlated to the cumulative frequency distribution 80 of the normalized swab rate of wells represented by the log profiles 26. By analyzing the inflection point of the cumulative frequency distribution 80, it can be, in one embodiment, determined what percent of wells contribute to the majority of production for each log profile 26. For example, for wells in log profile #1, about 5 percent of the wells make significant oil production.

Figure 4G:
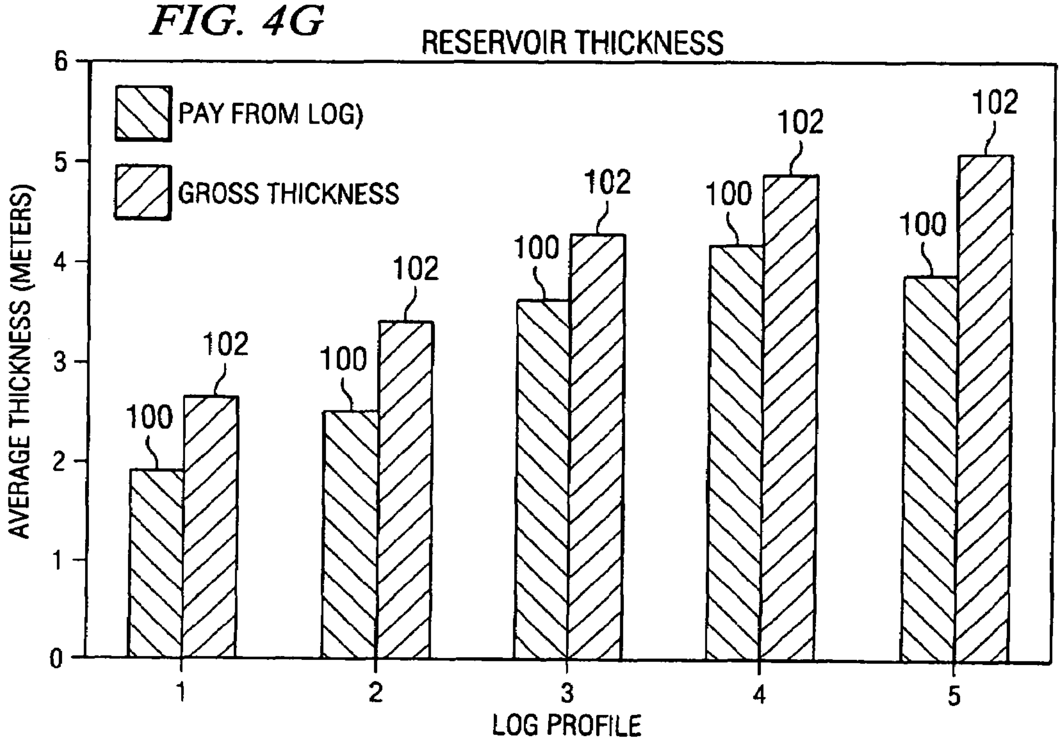
Figure 4F:
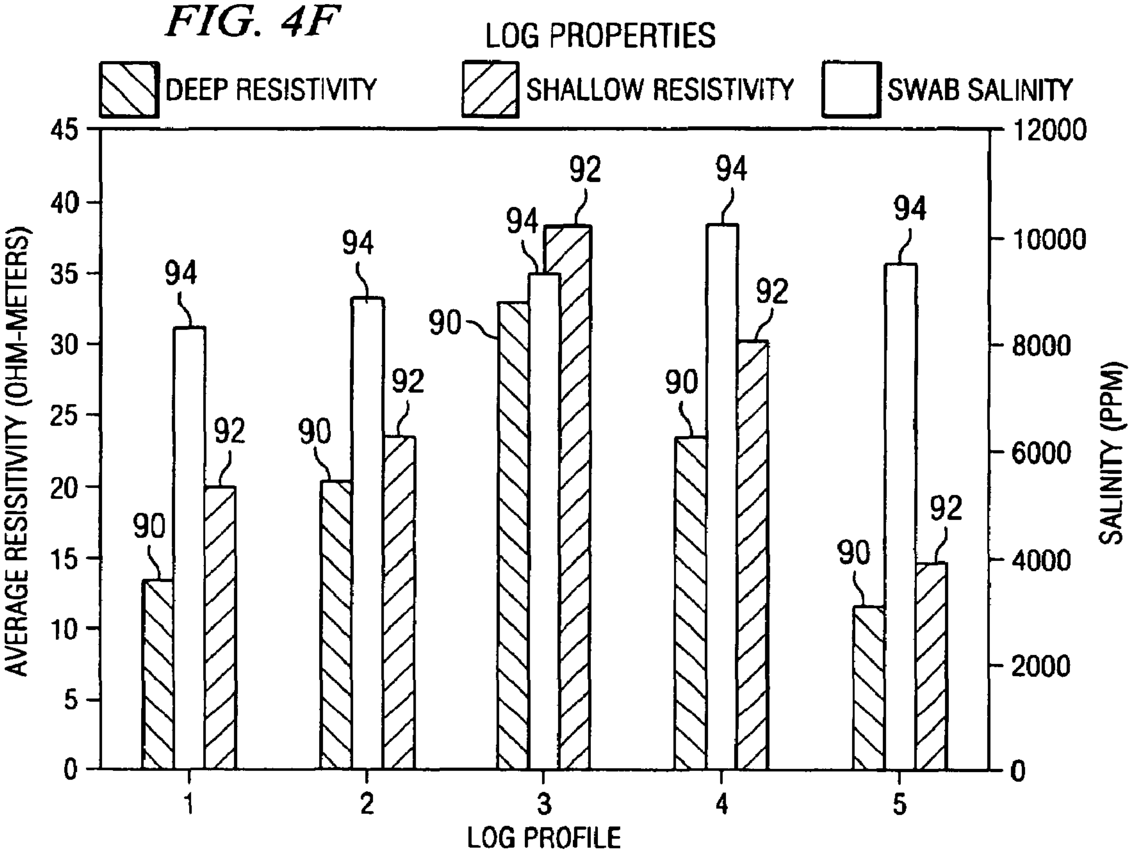

FIG. 4F illustrates log properties for the exemplary log profiles 26 of FIG. 3. In particular, each log profile 26 is correlated to deep resistivity 90, shallow resistivity 92 and swab salinity 94 for the wells represented by the log profiles 26. The log profiles 26 are substantially linearly aligned for the log properties with log profile #3 having the highest deep and shallow resistivities 90 and 92.

FIG. 4G illustrates reservoir thickness for the exemplary log profiles 26 of FIG. 3. In particular, each log profile 26 is related to corresponding pay thickness 100 and gross thickness 102 for the wells represented by the log profiles 26. Alignment of the log profiles 26 is substantially linear with pay and gross thickness 100 and 102 peaking at log profile #5 and minimized at log profile #1.

Figure 4H:
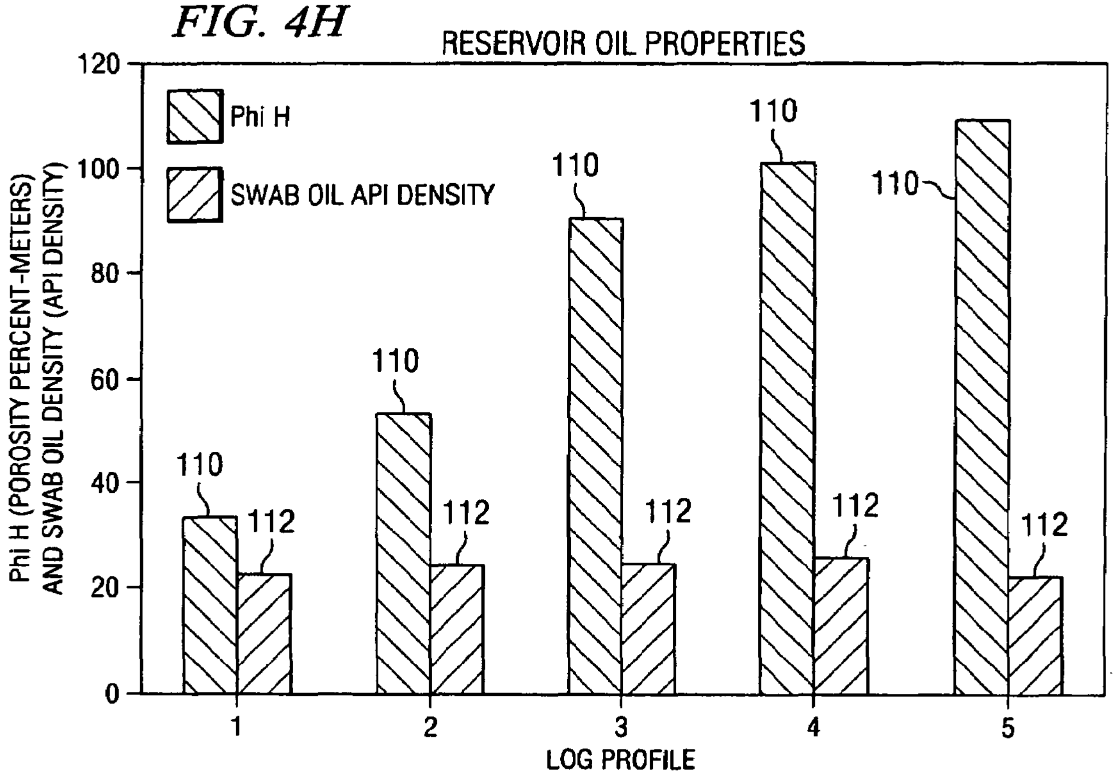
Figure 4I:
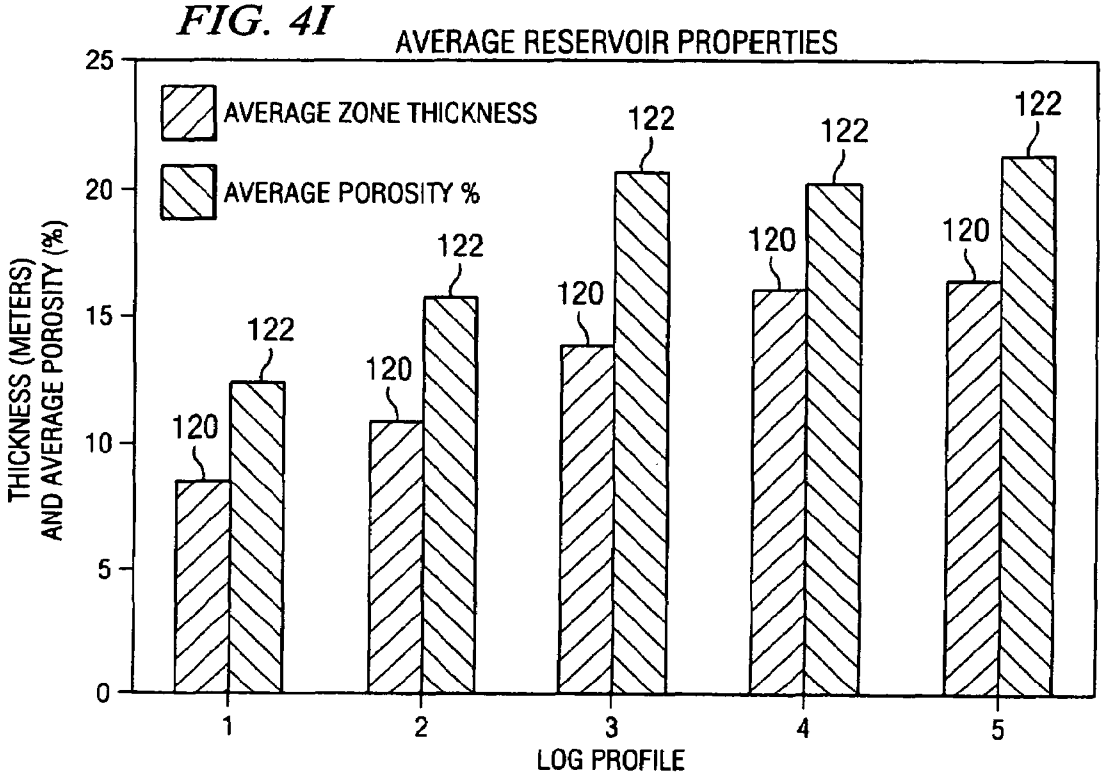

FIG. 4H illustrates reservoir oil properties for the exemplary log profiles 26 of FIG. 3. In particular, each log profile 26 is correlated to Phi H 110 and swab oil American Petroleum Institute (API) density 112 of wells represented by the log profile 26. Log profile 26 alignment indicates Phi H 110 increasing for each of log profiles #1-#5 and with swab oil API density 112 maximized for log profiles #2-#4.

FIG. 41 illustrates average reservoir properties for the exemplary log profiles 26 of FIG. 3. In particular, each log profile 26 is correlated to average zone thickness 120 and an average porosity 122 of wells represented by the log profile 26. Alignment of the log profiles 26 illustrate the average zone thickness 120 increasing for each of log profiles #1-#5 and the average porosity 122 substantially even for log profiles #3-#5 and reduced for log profiles #1 and #2.

Based on these validation indicators which are also production indicators, wells having a log profile 26 matching (including similar) to cluster #3 will produce the most rate and highest oil fraction. Wells matching cluster #5 will produce more water than oil and wells similar to cluster #1 will have the porous reservoir quality. As seen, wells assigned to cluster #1 swabbed dry 38 percent of the time.

Figure 5:
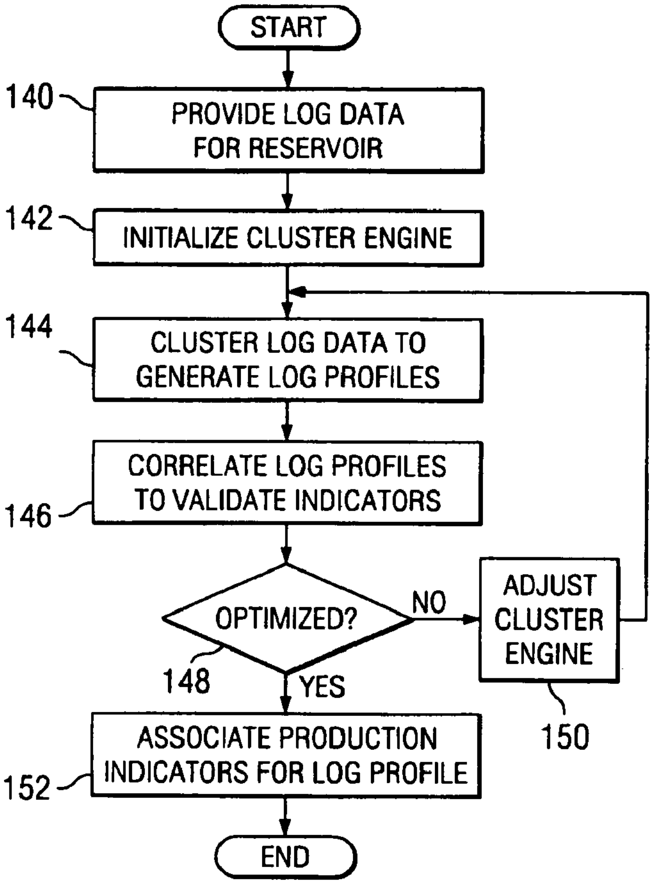
FIG. 5 illustrates one embodiment of a method for generating a production prediction model.

FIG. 5 illustrates one embodiment of a method for generating a production prediction model 16. In this embodiment, the model generator 10 of FIG. 1 may be used and the production prediction model 16 based on clustered log data. The production predication model 16 may be otherwise suitably generated. The method may be entirely or partly performed by a computer with or without user input.

Referring to FIG. 5, the method starts at step 140 where logs for a reservoir are provided. In one embodiment, the logs may be stored in the reservoir data 12. In this embodiment, the logs may be provided by storing the logs and production indicators for the corresponding wells in reservoir data 12 or otherwise making the data available to the cluster engine 20. The logs may be MRI logs.

At step 142, the cluster engine 20 is initialized. The cluster engine 20 may be initialized by setting node weights to a default or equivalent value. At step 144, the cluster engine 20 clusters logs to generate log profiles 26. As previously described, the cluster engine 20 may use a SOM neural network to perform the clustering with node weights automatically adjusted during processing by the cluster engine 20 to improve data, or log profile 26 separation. The cluster engine 20 may continue the clustering process until, for example, separation of the log profiles 26 cannot be further improved and/or substantially improved.

Next, at step 146, each log profile 26 may be correlated to validation indicators for the represented wells. In one embodiment, correlation may be performed by the correlation engine 22. In another embodiment, correlation may be manually performed by a user. As previously described, the validation indicators may comprise prediction and/or other indicators. As also previously described, validation may be omitted.

Proceeding to decision step 148, it is determined by the optimization engine or otherwise if the log profiles 26 are optimized. As previously described, log profiles 26 may be determined not to be optimized when the validation indicators indicate that less than a minimum number of wells are represented by one or more of the log profiles 26, data separation between two or more of the log profiles 26 is minimal or below a threshold limit and/or the validation indicators indicate a poor alignment to reservoir and/or production. Alternatively, the log profiles 26 may be optimized when separation between log profiles 26 is acceptable, each log profile 26 represents a minimum number of wells and/or the log profiles 26 have a linear or substantially linear alignment with the validation indicators. If the log profiles 26 are not determined to be optimized at decisional step 148, the No branch leads to step 150, where the cluster engine 20 is adjusted. The cluster engine 20 may be adjusted by altering a number of clusters or by altering the number of data bins. Step 150 returns to step 144 where the log data is reclustered by the adjusted cluster engine 20.

When the log profiles are determined to be optimized at decisional step 148, the Yes branch leads to step 152 where production indicators for each log profile are associated with the log profile. The production indicators may be determined based on average swab test results and/or production from the represented wells for each cluster. In one embodiment, the production indicators may be the validation indicators or a subset of the validation indicators.

The production indicators may be associated with each log profile 26 by relating the production indicators to corresponding log profiles 26. As used herein, associating includes performing, storing or accessing association. Production indicators may be electrically related to the log profiles 26 in the production prediction model 16, through pointers or otherwise or may be manually related to the log profiles 26 through hard copy outputs or otherwise. The optimized log profiles 26 and associated production indicators may be stored as a production prediction model 16. As previously described, in another embodiment, the production prediction model 16 may comprise the trained cluster engine 20 with the associated production indicators.

Figure 6:
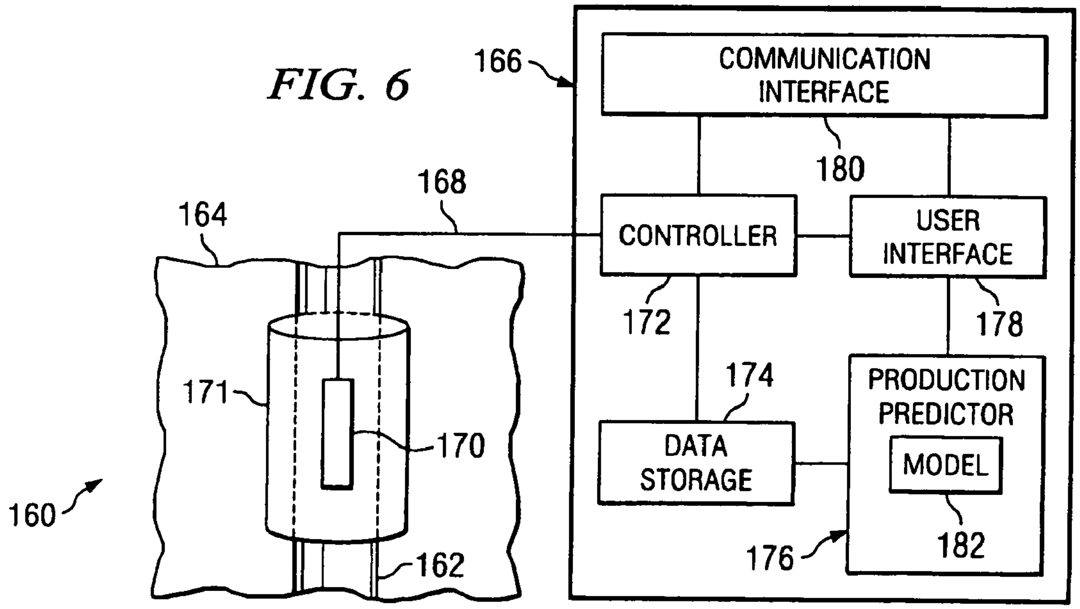
FIG. 6 illustrates one embodiment of a system for predicting production of a reservoir in a well.

FIG. 6 illustrates one embodiment of a system 160 for predicting production of a well. System 160 may be an apparatus comprising a storage device and a connected or otherwise coupled processor. The processor is controllable by a program on the storage device to predict production. In the illustrated embodiment, production is predicted based on clustered MRI data. As previously described, production may be otherwise suitable predicted without departing from the scope of the disclosure.

Referring to FIG. 6, the system 160 includes a well bore 162 and a reservoir 164. A logging system 166 operates, via a wireline 168, a logging tool 170 in the well bore 162. The logging tool 170 is, in the illustrated embodiment, a MRI logging tool collecting data from a logging area 171 of the reservoir 164 in the vicinity of the well bore 162. In a specific embodiment, the MRI logging tool 170 is the MRIL tool manufactured by NUMAR Corporation, a HALLIBURTON company. Any other MRI logging tool using magnetic components to collect $T_1$, $T_2$ or other magnet resonance times may be used. In this and other embodiments, the logging tool 170 is lowered into the well 162 to analyze and collect information on properties of the reservoir in logging area 171.

The MRI logging tool 170 may in one embodiment include a generally cylindrical permanent magnet having a longitudinal axis coaxial with the longitudinal axis of the well bore 162. Alternatively, a plurality of permanent magnets may be employed. Permanent magnet may have a uniform magnetization substantially perpendicular to the longitudinal axis of the logging tool 170, which is parallel to the longitudinal axis of the well bore 162. One or more coil windings may be arranged on top of the magnet to form the tool antenna. The permanent magnet and coil windings may be housed on non-conductive, non-ferromagnetic protective housing. As previously described, during operation, the logging tool may measure $T_1$ and/or $T_2$ properties of a reservoir zone in the area of investigation of the MRI tool measurement.

The logging system 166 may comprise an integrated computer system on a personal computer, laptop, or other suitable computer. In another embodiment, the logging system 166 may comprise a plurality of distributed components connected via a local and/or wide area network. For example, the logging system 166 may be housed together in a logging truck.

The logging system 166 may comprise controller 172, data storage 174, production predictor 176, user interface 178 and communication interface 180. It will be understood that the logging system 166 may have additional, less, or different components and/or functionality of the components may be otherwise distributed.

The controller 172 controls the logging tool 170. In the MRI embodiment, the controller 172 provides a control output to a pulse programmer which controls operation of the MRI logging tool 170. MRI signals from excited hydrogen protons in fluids of the the reservoir 164 surrounding the well bore 162 are picked up by the antenna and transmitted to the surface via wireline 168 for further analysis, interpretation and storage.

Data storage 174 may comprise a database or any other suitable memory for storing outputs from the logging tool 170. In one embodiment, data storage 174 stores $T_1$ and/or $T_2$ data from the logging tool. Data storage 174 may also store porosity, permeability and other data and/or interpreted results determined from then porosity $T_1$ and $T_2$ data.

Production predictor 176 includes a production prediction model 182. As previously described, the production prediction model 182 may comprise the trained cluster engine 20, a copy of a train cluster engine 20 and/or the log profiles 26 with, in one embodiment, associated production indicators. Accordingly, the production predictor 176 may be an SOM neural network, standard processor or other suitable processing system.

The user interface 178 comprises any suitable input/output to enable a user to input data and/or instructions or receive data and/or results from logging system 166. In one embodiment, the interface 178 may be a local GUI. The GUI may display logs, log profiles, correlations of log profiles with validation indicators in graphs and/or other suitable formats.

The communication interface 180 may communicate with a central or other remote office over any suitable network link or links. For example, the communication interface 180 may communicate with a central office over a local area network (LAN), wide area network (WAN), the Internet or a telephone network. In other embodiments, the communication interface 180 may communicate over satellite, RF or other suitable wireless links.

In operation, logging tool 170 is lowered into the well bore 162 and collects data on the reservoir 164 in the vicinity of the well bore 162 or logging area 171. Logging tool 170 is controlled by controller 172 and the logging data stored as a log in data storage 174. Upon the completion of logging, the production predictor 176 may access the log and match the log to one of log profiles 26 in the production prediction model 182. The production predictor 176 may output to the user through the user interface 178 the matching log profile 26 and production indicators for the log profile 26, and thus the well. The production predictor's output from the production prediction model 182 is described in more detail below in connection with FIGS. 7A-B.

In another embodiment, the production predictor 176 may be remote from the logging system 166 and accessed via the communication interface 180. In this embodiment, the log in data storage 174 may be remotely accessed and the corresponding log profile 26 and production indicators determine remotely and provided to the user interface 178 via the communication interface 180. In still another embodiment, the production predictor 176 may locally at the well site provide an initial prediction based on the production prediction model 182 with further analysis and further production indicators provided based on remote processing. A production prediction is an estimate of oil, gas and/or water that can be produced from a well based on correlation to production of a same or similar well when the correlation has demonstrated a high degree of relevance. In still another embodiment, the production predictor 176 may match the log to a plurality of log profiles 26, in which case the production indicators for the matching log profiles may, for example, be averaged.

Figure 7A:
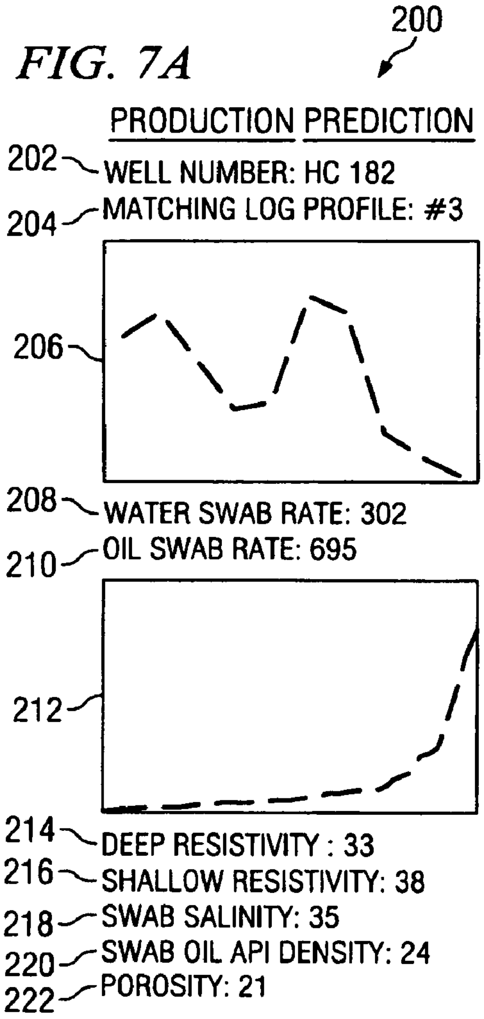
FIGS. 7A-B illustrate exemplary production prediction output by the system of FIG. 6.
Figure 7B:
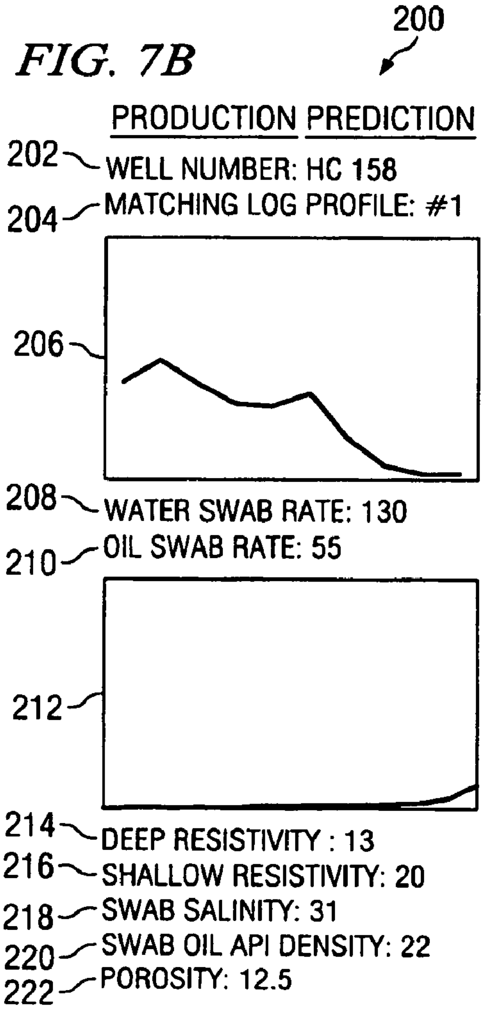

FIGS. 7A-B illustrate production prediction output 200 in accordance with one embodiment. The production prediction output 200 may comprise true indicators of well production, which includes production from a zone of the well. The production prediction output 200 may thus be independent of non-process factors and comprise average cluster attributes.

Referring to FIGS. 7A-D, the production prediction output 200 includes a well number 202 and a matching log profile 204. The production prediction output 200 may also include the porosity distribution 206 at different $T_1/T_2$ for the matching log profile 26. Water swab rate 208 and oil swab rate 210 may also be provided. The water and oil swab rates 208 and 210 may be averages for wells clustered into the matching log profile 204.

A cumulative frequency distribution at normalized swab rate 212 may also be provided for the selected log profile 26. Also provided may be deep resistivity 214, shallow resistivity 216, swab salinity 218 and swab oil API density 220 for the matching log profile 204. In one embodiment, the deep resistivity 214, shallow resistivity 216, swab salinity 218 and swab oil API density 220 may be averages for wells clustered into the matching log profile 204. Porosity 222 for the well 202 may also be provided. As with other production indicators, the porosity may be the average porosity for wells clustered into the matching log profile 204. For exemplary well HC 182, production may be predicted to be 302 liters/hour water and 695 liters/hour oil. Well HC 158 may have a production prediction of 130 liters/hour water and 55 liters/hour oil.

Each of these characteristics may comprise a production indicator and together form a production profile. A production profile is a set of production indicators that together provide an overview of anticipated well production. The production prediction output 200 provided by the production predictor 176 may include additional, less or different information and/or may be differently organized without departing from the scope of the present disclosure.

Figure 8:
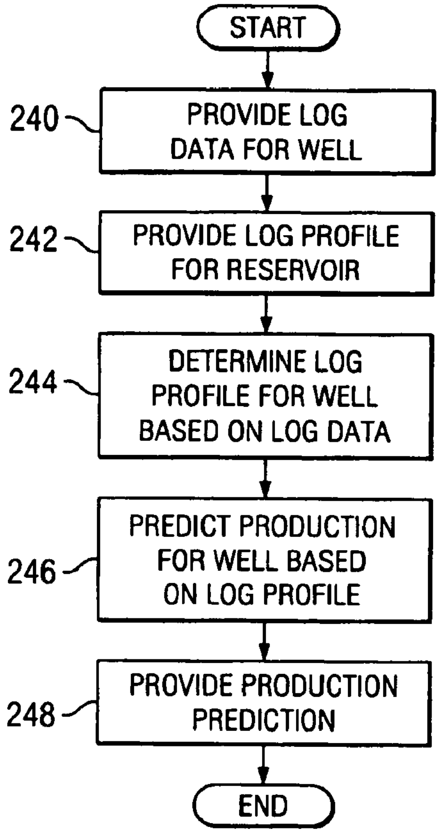
FIG. 8 illustrates one embodiment of a method for predicting production of a well.

FIG. 8 illustrates a method for predicting production of a well in accordance with one embodiment of the disclosure. In this embodiment, production of a well is predicted at the well site during, after or otherwise in connection with logging operations. Production may be otherwise suitably predicted without departing from the scope of the disclosure. The method may be entirely or partly performed by a computer with or without user input.

Referring to FIG. 8, the method begins at step 240 where log data for a well is provided, by loading or otherwise. Log data may be provided by receiving, storing, accessing and/or providing access to one or more logs for the well. Next, at step 242, log profiles 26 are loaded or otherwise provided for the reservoir. Log profiles may be loaded or otherwise provided by receiving log profiles 26, storing the log profiles 26, accessing the log profiles 26, providing access to the log profiles 26 and/or providing data allowing selection of a corresponding or other matching log profile.

Proceeding to step 244, a log profile 26 is determined for a well based on the log for the well. The log profile 26 may be determined by matching a log to a log profile 26. As previously described, a log may match a log profile when the log is selected as best matching one of the log profiles 26, having a least difference or otherwise best corresponding to one of the log profiles 26 or mapped to one of the log profiles 26 using a SOM, algorithmic or other automated process. Accordingly, the log need not be exact or have a substantial fit to the log profile 26.

At step 246, production is predicted for the well based on the matching log profile 26. The step of predicting production may be performed by providing a visual or other suitable prediction indication or other output. In one embodiment, each log profile 26 is associated with one or more production indicators and production predicted by supplying the production indicators associated with the matching log profile 26. At step 248, the production prediction is provided to a user or otherwise output for use in completion and/or other well decisions.

A number of embodiments of the invention have been described. Nevertheless, it will be understood that various modifications may be made without departing from the spirit and scope of the invention. For example, log profiles 26 may be utilized to compare effectiveness of well completion and/or stimulation procedures for the represented wells. In this context, a well having production below or substantially below that of other wells in its log profile 26 may be reworked, otherwise completed and/or stimulated based on tools and procedures used for the other wells in order to increase production. Accordingly, other embodiments are within the scope of the following claims.

What is claimed is:

1. A method for predicting production of a well, comprising:

associating log profiles for wells in a reservoir to production indicators for wells in the reservoir;

matching a log for a well to a corresponding log profile;

predicting production of each well based on one or more of the production indicators associated with the corresponding log profile; and performing a well operation based on the production prediction.

2. The method of claim 1, wherein the log profiles comprise clustered log profiles.

3. The method of claim 1, wherein the log profiles are of one or more well characteristics and the log is of the one or more well characteristics.

4. The method of claim 3, wherein the one or more well characteristics comprise reservoir attributes.

5. The method of claim 4, wherein the reservoir attributes comprise petrophysical properties.

6. The method of claim 1, wherein the log profiles and the log comprise magnetic resonance imaging (MRI) data.

7. The method of claim 6, wherein the MRI data comprises $T_1$ data.

8. The method of claim 6, wherein the MRI data comprises $T_2$ data.

9. The method of claim 6, wherein the MRI data comprises magnetic resonance time data.

10. The method of claim 6, wherein the MRI data comprises porosity data and at least one of $T_{1\ and\ T2}$ data.

11. The method of claim 6, wherein the MRI data comprises a porosity distribution at different magnetic resonance times.

12. The method of claim 1, further comprising generating the log profiles by clustering logs from a plurality of wells in the reservoir.

13. The method of claim 12, wherein the log is matched to the corresponding log profile using a computer system.

14. The method of claim 12, wherein a number of logs clustered to generate the log profiles exceeds 100.

15. The method of claim 12, further comprising clustering the logs for the plurality of wells of the reservoir using a self organizing map (SOM) neural network.

16. The method of claim 12, further comprising adjusting clustering of the logs based on validation indicators.

17. The method of claim 12, further comprising optimizing clustering of the logs.

18. The method of claim 17, further comprising optimizing clustering of the logs based on at least one of enhancing contrast of the log profiles and enhancing distribution of logs in the log profiles.

19. The method of claim 1, further comprising:
making a completion decision based on the prediction of production.

20. A method for predicting production of a well, comprising:
logging a well in a reservoir to determine one or more reservoir attributes at the well;
predicting production of the well based on the one or more reservoir attributes at the well and log profiles of the one or more reservoir attributes; and
performing a well operation based on the production predicition,
wherein the log profiles are based on clustered logs of the one or more reservoir attributes for a plurality of wells.

21. The method of claim 20, wherein the plurality of wells are in the reservoir.

22. The method of claim 20, wherein production is predicted using a computer system.

23. The method of claim 20, wherein the one or more reservoir attributes comprise magnetic resonance imaging (MRI) data.

24. The method of claim 23, wherein the MRI data comprises porosity data and at least one of $T_1$, and $T_2$ data.

25. The method of claim 20, wherein predicting production of the well comprises predicting oil and water production of the well.

26. Logic encoded in media, the logic operable to:
receive a plurality of log profiles based on clustered logs for wells in a reservoir;
predict production of a well based on a log for the well and the log profiles; and
generate an output signal of the production for output to a user;
wherein each log profile associated with one or more production indicators.

27. The logic of claim 26, the logic operable to predict production using a self-organizing map (SOM) neural network.

28. The logic of claim 26, wherein the log profiles and the log comprise magnetic resonance imaging (MRI) data.

29. The logic of claim 28, wherein the MRI data comprises porosity data and at least one of $T_{1\ and\ T2}$ data.

30. Logic encoded in media, the logic operable to:
cluster logs from a plurality of wells to generate a plurality of log profiles;
associate the log profiles with production indicators;
determine a predicted production of a well based on one or more of the production indicators associated with the corresponding log profile; and
generate an output signal of the production prediction for output to a user.

31. The logic of claim 30, wherein a number of logs clustered to generate the log profiles exceeds 100 in number and a number of the log profiles is less than or equal to 10 in number.

32. The logic of claim 30, wherein the logs comprise magnetic resonance imaging (MRI) data.

33. The logic of claim 32, wherein the MRI data comprises porosity data and magnetic resonance imaging time data.

34. A system for predicting production of a well, comprising:
means for associating log profiles for wells in a reservoir to production indicators for wells in the reservoir;
means for matching a log for the well to a corresponding log profile;
means for predicting production for each well based on one or more of the production indicators; and
means for outputting the production predicting to a user.

35. The system of claim 34, wherein the log profiles comprise clustered log profiles.

36. The system of claim 34, wherein the log profiles are of one or more well characteristics and the log is of the one or more characteristics.

37. The system of claim 36, wherein the one or more characteristics comprise magnetic resonance imaging (MRI) data.

38. The system of claim 37, wherein the MRI data comprises porosity data and at least one of $T_1$ and $T_2$ data.

39. The system of claim 34, further comprising means for generating the log profiles by clustering logs from a plurality of wells in the reservoir.

40. The system of claim 39, further comprising means for adjusting clustering of the logs based on validation indicators.

41. The system of claim 39, further comprising means for optimizing clustering of the logs based on at least one of enhancing contrast of the log profiles and enhancing distribution of logs in the log profiles.

42. A system for predicting production, comprising:
means for logging a well in a reservoir to determine one or more reservoir attributes at the well;
means for predicting production of the well based on the one or more reservoir attributes at the well and log profiles of the one or more reservoir attributes; and
means for outputting the production prediction to a user,
wherein the log profiles are based on clustered logs for the one or more reservoir attributes for a plurality of wells.

43. The system of claim 42, wherein the plurality of wells are in the reservoir.

44. The system of claim 42, wherein the one or more reservoir attributes comprises magnetic resonance imaging (MRI) data.

45. The system of claim 44, wherein the MRI data comprises porosity data and at least one of $T_1$ and $T_2$ data.

46. The system of claim 42, wherein the means for predicting production comprises means for predicting oil and water production of the well.

47. A computer method for predicting production of a well, comprising:

storing a plurality of log profiles for a reservoir, each log profile based on magnetic resonance imaging (MRI) data for a plurality of wells in the reservoir;

receiving an MRI log for a well in the reservoir;

matching the MRI log for the well to a corresponding log profile; and predicting production of the well based on production indicators associated with the corresponding log profile; and outputting the production prediction to a user.

48. The method of claim 47, further comprising:

storing a plurality of MRI logs for wells in the reservoir; and clustering the MRI logs to generate the log profiles for wells in the reservoir.

49. The method of claim 47, wherein the MRI data comprises porosity data and at least one of $T_1$ and $T_2$ data.

50. The method of claim 47, further comprising predicting oil and water production of the well based on production indicators associated with the corresponding log profile.

51. A computer model for predicting production of a well stored in a memory device accessible by a user, comprising:

a plurality of log profiles based on clustered log data; and a production profile associated with each log profile.

52. The model of claim 51, wherein the log profiles comprise magnetic resonance imaging (MRI) data.

53. The model of claim 52, wherein the MRI data comprises porosity data and magnetic resonance time data.

54. The model of claim 53, wherein the magnetic resonance time data comprises at least one of $T_1$ and $T_2$ data.

55. A method for generating a production prediction model, comprising:

providing logs for a plurality of wells in a reservoir;

clustering the logs into a limited number of log profiles;

associating each log profile to one or more production indicators;

generating the production prediction model based on the log profiles and associated production indicators; and storing the production prediction model in a memory device.

56. The method of claim 55, further comprising clustering the logs into the limited number of log profiles using a neural network.

57. The method of claim 56, further comprising clustering the logs into the limited number of log profiles using a self-organizing map (SOM) neural network.

58. The method of claim 55, wherein the logs comprise magnetic resonance imaging (MRI) data.

59. The method of claim 58, wherein the MRI data comprise porosity data and at least one of $T_1$ and $T_2$ data.

60. The method of claim 55, further comprising optimizing clustering of the logs into the limited number of log profiles.

61. The method of claim 55, wherein the method comprises a computerized method.

62. A computer system for generating a production prediction model, comprising:

a cluster engine operable to receive logs for a plurality of wells in a reservoir;

the cluster engine operable to cluster the logs into a limited number of log profiles; and a correlation engine operable to correlate the log profiles to production indicators for the wells, the computer system operable to store the production prediction model in memory.

63. The system of claim 62, wherein the logs comprise magnetic resonance imaging (MRI) data.

64. The system of claim 63 wherein the MRI data comprises porosity data and magnetic resonance time data.

65. The system of claim 64, wherein the magnetic resonance time data comprises at least one of $T_1$ and $T_2$.

66. The system of claim 62, wherein the cluster engine comprises a self-organizing map (SOM) neural network.

67. The system of claim 62, further comprising an optimization engine operable to optimize clustering of the logs into the limited number of log profiles by the cluster engine.

68. A system for predicting production for a well, comprising:

a plurality of log profiles for wells in a reservoir;

a production profile associated with each log profile;

a production predictor operable to determine a production profile for a well by determining a log profile corresponding to a log for the well; and an output device operable to output the production prediction to a user.

69. The system of claim 68, wherein the log profiles and the log comprise magnetic resonance imaging (MRI) data.

70. The system of claim 69, wherein the MRI data comprises porosity data and at least one of $T_1$ and $T_2$ data.

71. The system of claim 68, wherein the production profile includes a prediction of oil and water production of the well.

72. The system of claim 67, wherein the system comprises a computer system.

73. An apparatus for production prediction of a well, comprising:

a storage device;

a processor coupled to the storage device;

the storage device storing a program for controlling the processor; and the processor operative with the program to receive a log for a well, to match the log to a corresponding log profile and to predict production of the well based on production indicators associated with the corresponding log profile; and an output device operable to output the production prediction to a user.

74. The apparatus of claim 73, wherein the log comprises a magnetic resonance imaging (MRI) log.

75. A method, comprising:

drilling wells in a reservoir; and predicting production for the wells based on magnetic resonance imaging (MRI) logs from the wells and composite MRI log profiles for the reservoir; and performing a well operation based on the production prediction.

* * * * *